(12) United States Patent
Dehlin et al.

(10) Patent No.: US 12,163,049 B2
(45) Date of Patent: Dec. 10, 2024

(54) SILICONE RELEASE COATING COMPOSITION AND METHODS FOR THE PREPARATION AND USE OF SAME

(71) Applicant: Dow Silicones Corporation, Midland, MI (US)

(72) Inventors: Lori Dehlin, Midland, MI (US); Mike Ferritto, Midland, MI (US); Timothy Mitchell, Midland, MI (US); Sze-Sze Ng, Midland, MI (US); Dianna Proffit, Midland, MI (US); Randall G. Schmidt, Midland, MI (US); Hannah Wedge, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 515 days.

(21) Appl. No.: 17/625,513

(22) PCT Filed: Sep. 11, 2020

(86) PCT No.: PCT/US2020/050286
§ 371 (c)(1),
(2) Date: Jan. 7, 2022

(87) PCT Pub. No.: WO2021/061417
PCT Pub. Date: Apr. 1, 2021

(65) Prior Publication Data
US 2022/0380623 A1    Dec. 1, 2022

Related U.S. Application Data

(60) Provisional application No. 62/906,775, filed on Sep. 27, 2019, provisional application No. 62/906,202, filed on Sep. 26, 2019.

(51) Int. Cl.
| | | |
|---|---|---|
| C09D 183/04 | (2006.01) | |
| C08G 77/00 | (2006.01) | |
| C08G 77/08 | (2006.01) | |
| C08G 77/12 | (2006.01) | |
| C08G 77/20 | (2006.01) | |
| C08J 7/04 | (2020.01) | |
| C08K 5/05 | (2006.01) | |
| C08K 5/12 | (2006.01) | |
| C08K 5/5425 | (2006.01) | |

(52) U.S. Cl.
CPC ........... *C09D 183/04* (2013.01); *C08G 77/08* (2013.01); *C08G 77/12* (2013.01); *C08G 77/20* (2013.01); *C08G 77/80* (2013.01); *C08J 7/0427* (2020.01); *C08K 5/05* (2013.01); *C08K 5/12* (2013.01); *C08K 5/5425* (2013.01)

(58) Field of Classification Search
CPC ........... G03G 15/2057; G03G 15/0818; G03G 15/2025; G03G 7/0046; G03G 15/0808; G03G 2215/2032; G03G 5/0578; G03G 13/286; G03G 15/1625; G03G 2215/2054; G03G 7/008; G03G 9/0821; G03G 13/20; G03G 15/6591; G03G 21/1814; G03G 2215/0861; G03G 2215/2016; G03G 5/14773; G03G 7/004; G03G 13/01; G03G 13/28; G03G 13/283; G03G 15/162; G03G 15/2064; G03G 15/6585; G03G 2215/00805; G03G 7/0006; G03G 7/0013; G03G 7/006; G03G 7/0066; G03G 9/1136; G03G 15/0233; G03G 15/08; G03G 15/0806; G03G 15/2007; G03G 15/2021; G03G 15/2028; G03G 15/2053; G03G 15/206; G03G 15/2098; G03G 21/1803; G03G 2215/00497; G03G 2215/0858; G03G 2215/0863; G03G 2215/1695; G03G 2215/2006; G03G 2215/2035; G03G 2215/2083; G03G 2215/2093; G03G 5/0564; G03G 5/0592; G03G 5/06142; G03G 5/062; G03G 5/078; G03G 5/12; G03G 5/14708; G03G 5/14786; G03G 7/0086; C09D 183/04; C08J 7/0427; C08G 77/08; C08G 77/12; C08G 77/20; C08G 77/80; C08K 5/05; C08K 5/12; C08K 5/5425
See application file for complete search history.

(56) References Cited

U.S. PATENT DOCUMENTS

| | | | |
|---|---|---|---|
| 3,159,601 A | 12/1964 | Ashby | |
| 3,220,972 A | 11/1965 | Lamoreaux | |
| 3,296,291 A | 1/1967 | Scotia et al. | |
| 3,419,593 A | 12/1968 | Willing | |
| 3,445,420 A | 5/1969 | Kookootsedes et al. | |
| 3,516,946 A | 6/1970 | Scotia | |
| 3,814,730 A | 6/1974 | Karstedt | |
| 3,989,667 A | 11/1976 | Lee et al. | |

(Continued)

FOREIGN PATENT DOCUMENTS

| | | | |
|---|---|---|---|
| EP | 0556023 A1 | 8/1993 | |
| EP | 0347895 B | 11/1993 | |

(Continued)

*Primary Examiner* — Robert S Jones, Jr.
*Assistant Examiner* — Lily K Sloan
(74) *Attorney, Agent, or Firm* — Catherine U. Brown

(57) ABSTRACT

A silicone release coating composition and method for its preparation and use are described. A release coating prepared by curing the silicone release coating composition has high immediate release force (>50 g/in). A release liner including the release coating is suitable for use as a transfer liner in processes for making composites articles, such as aircraft parts.

12 Claims, No Drawings

(56) References Cited

U.S. PATENT DOCUMENTS

| | | |
|---|---|---|
| 3,989,668 A | 11/1976 | Lee et al. |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,138,012 A | 8/1992 | Riding et al. |
| 5,175,325 A | 12/1992 | Brown et al. |
| 5,248,716 A | 9/1993 | Lin et al. |
| 5,625,023 A | 4/1997 | Chung et al. |
| 6,124,419 A | 9/2000 | Armstrong et al. |
| 6,489,407 B1 | 12/2002 | Clark et al. |
| 6,586,535 B1 | 7/2003 | Clark et al. |
| 6,677,407 B1 | 1/2004 | Bilgrien et al. |
| 6,805,914 B2 | 10/2004 | Clark et al. |
| 7,846,550 B2 | 12/2010 | Ooms et al. |
| 8,722,153 B2 | 5/2014 | Ekeland |
| 9,487,677 B2 | 11/2016 | Griswold et al. |
| 9,562,149 B2 | 2/2017 | Cray et al. |
| 2003/0088042 A1 | 5/2003 | Griswold et al. |
| 2003/0120000 A1 | 6/2003 | Clark et al. |
| 2003/0160207 A1* | 8/2003 | Sakaguchi ........... C08K 5/5419 |
| | | 252/71 |
| 2004/0254274 A1 | 12/2004 | Griswold |
| 2005/0038188 A1 | 2/2005 | Ahn et al. |
| 2008/0234426 A1 | 9/2008 | Kotani et al. |
| 2011/0287267 A1 | 11/2011 | Hori et al. |
| 2012/0213721 A1 | 8/2012 | Roy et al. |
| 2012/0328863 A1 | 12/2012 | Kuo |
| 2017/0233612 A1 | 8/2017 | Han et al. |

FOREIGN PATENT DOCUMENTS

| | | |
|---|---|---|
| WO | 2015183572 A1 | 12/2015 |
| WO | 2016001237 A1 | 1/2016 |

\* cited by examiner

SILICONE RELEASE COATING COMPOSITION AND METHODS FOR THE PREPARATION AND USE OF SAME

CROSS REFERENCE TO RELATED APPLICATIONS

This application is a U.S. national stage filing under 35 U.S.C. § 371 of PCT Application No. PCT/US20/050286 filed on 11 Sep. 2020, which claims the benefit of U.S. Provisional Patent Application No. 62/906,202 filed 26 Sep. 2019 and U.S. Provisional Patent Application 62/906,775 filed 27 Sep. 2019 under 35 U.S.C. § 119 (e). PCT Application No. PCT/US20/050286 and U.S. Provisional Patent Application No. 62/906,202 and U.S. Provisional Patent Application 62/906,775 are each hereby incorporated by reference.

TECHNICAL FIELD

A silicone release coating composition and method for its preparation are disclosed. The silicone release coating composition can be cured on a substrate to form a transfer liner useful in the manufacture of structural composites.

BACKGROUND

Multi-layer, fiber reinforced prepregs are used to make structural composites, such as aircraft parts. Such prepregs may contain reinforcing fibers in a matrix of a high strength thermoplastic resin such as a polyetherketone, polyether sulfone, or polyimide; or a B-staged curable thermosetting resin such as epoxy, bismaleimide, cyanate, or crosslinkable polyimide. The different prepreg layers may be pre-assembled, and then molded to shape under vacuum and heat. More than one release liner may be used at varying stages during prepreg assembly, lay up, and curing. Release liners maybe re-used multiple times.

A release liner is needed because the matrix of the prepreg is tacky before cure. The release liner may be used to hold the prepreg in place during transport and storage. And, at the layup stage, a release liner (transfer liner) with high immediate release force may be needed to properly transfer the prepreg to the layup machine.

Problem to be Solved

There is an industry need for a release liner with the ability to attach to a prepreg and yield a high release force immediately (e.g., within 30 minutes) after attachment.

Previously proposed release liners may be made from organofunctional epoxy silicone polymers that require radiation cure, which may be expensive; or solvent based release coating compositions, which may be hazardous. Commercially available silicone release coatings may have insufficient immediate release force for use in the manufacture of structural composites in the method described above. There is need in the structural composites industry for an economical, low solvent or solventless, silicone release coating with high immediate release force.

SUMMARY

A silicone release coating composition comprises:
A) a polydiorganosiloxane of unit formula $(R^M{}_3SiO_{1/2})_2(R^M R^U SiO_{2/2})_a(R^M R^A SiO_{2/2})_b$, where $R^M$ is an alkyl group of 1 to 6 carbon atoms, $R^U$ is an aliphatically unsaturated hydrocarbon group of 2 to 16 carbon atoms, and $R^A$ is an alkaryl group of formula

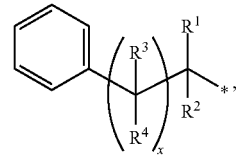

where each of $R^1$, $R^2$, $R^3$ and $R^4$ is independently selected from the group consisting of hydrogen and an alkyl group of 1 to 6 carbon atoms, with the proviso that at least 1 instance of $R^3$ and/or $R^4$ is the alkyl group, subscript x is 1 to 6, and * denotes a point of attachment (where the alkaryl group bonds to a silicon atom), and subscripts a and b have values such that the polydiorganosiloxane comprises 30 weight % to 95 weight % of groups $R^A$;

B) a polyorganohydrogensiloxane crosslinker of unit formula $(R^M{}_3SiO_{1/2})_2(R^M HSiO_{2/2})_c(R^M R^A SiO_{2/2})_d$, subscripts c and d have values such that the polyorganohydrogensiloxane comprises 30 weight % to 95 weight % of groups $R^A$ and has at least 3 silicon bonded hydrogen atoms per molecule;

C) a hydrosilylation reaction catalyst; and
D) a hydrosilylation reaction inhibitor.

The silicone release coating composition can be used in a process comprising applying the silicone release coating composition to a surface of a substrate and curing the silicone release coating composition; thereby forming a release liner comprising a silicone release coating on the surface of the substrate.

DETAILED DESCRIPTION

The silicone release coating composition described herein comprises:

35 weight % to 45 weight % of A) a polydiorganosiloxane of unit formula $(R^M{}_3SiO_{1/2})_2(R^M R^U SiO_{2/2})_a(R^M R^A SiO_{2/2})_b$, where $R^M$ is an alkyl group of 1 to 6 carbon atoms, $R^U$ is an aliphatically unsaturated hydrocarbon group of 2 to 16 carbon atoms, and $R^A$ is an alkaryl group of formula

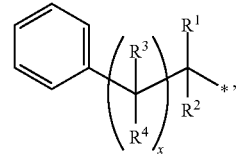

where each of $R^1$, $R^2$, $R^3$ and $R^4$ is independently selected from the group consisting of hydrogen and an alkyl group of 1 to 6 carbon atoms, with the proviso that at least 1 instance of $R^3$ and/or $R^4$ is the alkyl group, subscript x is 1 to 6, and * denotes a point of attachment (where the alkaryl group bonds to a silicon atom in the unit formula shown above), and subscripts a and b have values such that the polydiorganosiloxane comprises 30 weight % to 95 weight % of groups $R^A$;

50 weight % to 65 weight % of B) a polyorganohydrogensiloxane crosslinker of unit formula $(R^M{}_3SiO_{1/2})_2(R^M HSiO_{2/2})_c(R^M R^A SiO_{2/2})_d$, subscripts c and d have values such that the polyorganohydrogensiloxane comprises 30 weight % to 95 weight % of groups $R^A$ and has at least 3 silicon bonded hydrogen atoms per molecule;

with the proviso that starting materials A) and B) are present in amounts sufficient to provide a molar ratio of silicon bonded aliphatically unsaturated groups in starting material A) to silicon bonded hydrogen atoms in starting material B) (i.e., an SiH/Vi ratio) of 1.5 to 2.5;

C) a hydrosilylation reaction catalyst, present in an amount sufficient to provide >0 ppm to ≤6,000 ppm Pt group metal based on combined weights of starting materials A), B), C) and D);

D) a hydrosilylation reaction inhibitor in an amount sufficient to provide an inhibitor:Pt group metal molar ratio of 10:1 to 200:1;

0 to <10 weight % of E) an anti-mist additive;

0 to <10 weight % of F) an anchorage additive; and 0 to <10 weight % of G) a solvent;

where amounts of starting materials A), B), C) and D) combined total >90 weight % to 100 weight % of the silicone release coating composition; and amounts of starting materials E), F) and G) combined total 0 to <10 weight % of the silicone release coating composition. Alternatively, starting materials A), B), C), and D) may comprise 100% of the silicone release coating composition. Alternatively, the silicone release coating composition may consist essentially of starting materials A), B), C), and D). Alternatively, the silicone release coating composition may consist of starting materials A), B), C), and D).

Starting Material A) Polydiorganosiloxane (with Unsaturated Groups and Alkaryl Groups)

The silicone release coating composition herein comprises a polydiorganosiloxane, which has both an aliphatically unsaturated hydrocarbon group and an alkaryl group. The polydiorganosiloxane may have unit formula $(R^M_3SiO_{1/2})_2(R^M R^U SiO_{2/2})_a(R^M R^A SiO_{2/2})_b$, where $R^M$ is an alkyl group of 1 to 6 carbon atoms, $R^U$ is an aliphatically unsaturated hydrocarbon group of 2 to 16 carbon atoms, and $R^A$ is an alkaryl group of formula

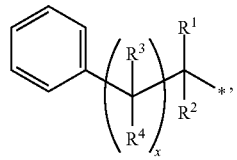

where each of $R^1$, $R^2$, $R^3$ and $R^4$ is independently selected from the group consisting of hydrogen and an alkyl group of 1 to 6 carbon atoms, with the proviso that at least 1 instance of $R^3$ and/or $R^4$ is the alkyl group and * denotes a point of attachment (where the alkaryl group bonds to a silicon atom in the unit formula shown above), subscript x may be 1 to 6, subscript a>0, subscript b>0, and subscripts a and b have values such that the polydiorganosiloxane comprises 30 weight % to 95 weight % of groups $R^A$, alternatively 30% to 80% of groups $R^A$. A quantity (a+b) has a value sufficient to give the polydiorganosiloxane a viscosity of 150 mPa·s to 10,000 mPa·s at RT measured using a Brookfield DV-III Ultra cone & plate viscometer with a #CP-52 spindle at 1.0 to 250 RPM. One skilled in the art would recognize that rotation rate decreases as viscosity increases and would be able to select the appropriate rotation rate when using this test method to measure viscosity.

Suitable alkyl groups for $R^M$, $R^1$, $R^2$, $R^3$, and $R^4$ are exemplified by include methyl, ethyl, propyl (including n-propyl and iso-propyl), and butyl (including n-butyl, tert-butyl, sec-butyl, and iso-butyl). Alternatively, the alkyl group may be methyl. In the alkaryl group, each of each of $R^1$, $R^2$, $R^3$ and $R^4$ is independently selected from the group consisting of hydrogen and an alkyl group of 1 to 6 carbon atoms. Alternatively, $R^1$ may be H. Alternatively, $R^1$ and $R^2$ may be H. Alternatively, $R^3$ may be H. Alternatively, $R^3$ may be H and $R^4$ may be methyl. Alternatively, in the alkaryl group $R^A$, subscript x may be 1.

Suitable aliphatically unsaturated groups for $R^U$ have 2 to 16 carbon atoms, alternatively 2 to 6 carbon atoms, and are exemplified by alkenyl and alkynyl. Suitable alkenyl groups include vinyl, allyl, butenyl, and hexenyl. Suitable alkynyl groups are exemplified by, but not limited to, ethynyl, propynyl, and butynyl. Alternatively, each $R^U$ may be vinyl or hexenyl. Alternatively, each R' may be vinyl.

Alternatively, in the polydiorganosiloxane, each $R^M$ is a methyl group, each $R^U$ is a hexenyl group, each $R^A$ is an alkaryl group of formula

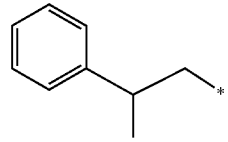 [SMILES: *CC(C)c1ccccc1]

phenyl-isopropyl-; subscript a has an average value of 5 to 7, and subscript b has an average value of 19 to 20.

Polydiorganosiloxanes suitable for use as starting material A) are exemplified by α,ω-trimethylsiloxy-terminated poly(dimethyl/methylvinyl/methylphenyl-isopropyl-)siloxane and α,ω-trimethylsiloxy-terminated poly(dimethyl/methylhexenyl/methyl, phenyl-isopropyl-)siloxane.

The polyorganosiloxane described above for starting material A) may be prepared by a method, described as follows. First, an organohydrogenpolysiloxane of unit formula $(R^M_3SiO_{1/2})_2(R^M HSiO_{2/2})_e$, where $R^M$ is as described above and subscript e=(c+d); and an alkene of formula

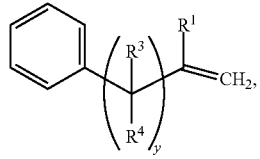

where $R^1$, $R^3$, and $R^4$ are as described above, and subscript y is 0 to 5, may be reacted via hydrosilylation reaction in the presence of a platinum group metal catalyst such as that described below for starting material C). The organohydrogenpolysiloxane is commercially available, e.g., from Dow Silicones Corporation of Midland, Michigan, USA. The alkene is exemplified by alphamethylstyrene, which is commercially available. Solvent may optionally be added, for example, to facilitate mixing of the catalyst with the other starting materials. One or more of the starting materials may be delivered in a solvent, such as that described below as starting material G).

For example, the polyorganohydrogensiloxane may be charged into a reactor and heated to a temperature of >RT to 100° C., alternatively 60° C. to 80° C. A catalyst, such as Karstedt's catalyst, may be added. An alkene, such as alphamethylstyrene may be added to the reactor. Continuous or multiple intermittent additions of catalyst and/or alkene may be contemplated to avoid deactivation of the catalyst and/or to control the exotherm of the reaction. The addition rate may be adjusted to ensure the reactor contents remain at 60° C. to 80° C. throughout the addition. The method may optionally further comprise recovering the polyorganohydrogensiloxane crosslinker by any convenient means, such as stripping and/or distillation with heat and optionally with reduced pressure, to remove unreacted starting materials and by-products, thereby forming an alkaryl-functional polyorganohydrogensiloxane.

The alkaryl-functional polyorganohydrogensiloxane described above may be used as starting material B), the polyorganohydrogensiloxane crosslinker (described below), or the alkaryl-functional polyorganohydrogensiloxane may be used to prepare the polyorganosiloxane for starting material A) by a method comprising hydrosilylation of the alkaryl-functional polyorganohydrogensiloxane and an alkane di-yl in the presence of a hydrosilylation reaction catalyst, such as that described below as starting material C). The alkane di-yl may be, for example, 1,5-hexadiene. Solvent may optionally be added, for example, to facilitate mixing of the catalyst with the other starting materials. One or more of the starting materials may be delivered in a solvent, such as that described below as starting material G).

For example, the polyorganohydrogensiloxane crosslinker may be charged into a reactor and heated to a temperature of >RT to 100° C., alternatively 50° C. to 80° C. A catalyst, such as Karstedt's catalyst, may be added. The alkane di-yl, such as 1,5-hexadiene, may be added to the reactor. Continuous or multiple intermittent additions of catalyst and/or alkane di-yl may be contemplated to avoid deactivation of the catalyst and/or to control the exotherm of the reaction. The addition rate may be adjusted to ensure the reactor contents remain at 50° C. to 80° C. throughout the addition. The method may optionally further comprise recovering the polyorganosiloxane by any convenient means, such as stripping and/or distillation with heat and optionally with reduced pressure, to remove unreacted starting materials and by-products. Furthermore, Reference Example 1 below shows a procedure for making a polydiorganosiloxanes suitable for use as starting material A).

The amount of starting material A) depends on various factors including the type and amount of other starting materials in the silicone release coating composition, the concentration of aliphatically unsaturated groups and silicon bonded hydrogen atoms of the starting materials in the silicone release coating composition, whether a solvent is present, and the amount of inhibitor present. However, the amount of starting material A) may be 35% to 45% based on combined weights of all starting materials in the silicone release coating composition, alternatively 36% to 44%, alternatively 37% to 43%, alternatively 38% to 42%, and alternatively 39% to 41%, on the same basis.

Starting Material B) Polyorganohydrogensiloxane Crosslinker

The silicone release coating composition further comprises starting material B), a polyorganohydrogensiloxane crosslinker. The polyorganohydrogensiloxane crosslinker may have unit formula $(R^M_3SiO_{1/2})_2(R^MHSiO_{2/2})_c(R^MR^4SiO_{2/2})_d$, where $R^M$ and $R^4$ are as described above, and subscript $c \geq 3$, subscript $d \geq 1$, and subscripts c and d have values such that the polyorganohydrogensiloxane comprises 30 weight % to 95 weight %, alternatively 30% to 80%, of groups $R^4$ and has at least 3 silicon bonded hydrogen atoms per molecule. Alternatively, a quantity (c+d) may have a value of 4 to 2,000, alternatively 5 to 100, and alternatively 10 to 60. Alternatively, subscript c may have an average value of 7 to 8, and subscript d may have an average value of 18 to 19.

Polyorganohydrogensiloxanes for starting material B) are exemplified by α,ω-trimethylsiloxy-terminated poly(dimethyl/methylhydrogen/methyl, phenyl-isopropyl-)siloxane.

Methods of preparing organohydrogenpolysiloxanes, such as hydrolysis and condensation of organohalosilanes, are well known in the art. Such method can be used to prepare an organohydrogenpolysiloxane of unit formula $(R^M_3SiO_{1/2})_2(R^MHSiO_{2/2})_e$, where $R^M$ is as described above and subscript e=(c+d). The polyorganohydrogensiloxane crosslinker described above for starting material B) may be prepared by a method comprising hydrosilylation reaction of the organohydrogenpolysiloxane of unit formula $(R^M_3SiO_{1/2})_2(R^MHSiO_{2/2})_e$, where $R^M$ and subscript e are as described above; and an alkene of formula

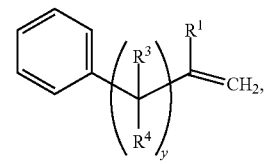

where $R^1$, $R^3$, $R^4$, and subscript y are as described above, in the presence of a platinum group metal catalyst such as that described below for starting material C). Solvent may optionally be added, for example, to facilitate mixing of the catalyst with the other starting materials. One or more of the starting materials may be delivered in a solvent, such as that described below as starting material G). Suitable alkenes of the formula shown above are known in the art, are exemplified by alpha methylstyrene, and are commercially available, e.g., from Millipore Sigma of St. Louis, Missouri, USA.

For example, the organohydrogenpolysiloxane may be charged into a reactor and heated to a temperature of >RT to 100° C., alternatively 60° C. to 80° C. A catalyst, such as Karstedt's catalyst, may be added. An alkene, such as alphamethylstyrene may be added to the reactor. Continuous or multiple intermittent additions of catalyst and/or alkene may be contemplated to avoid deactivation of the catalyst and/or to control the exotherm of the reaction. The addition rate may be adjusted to ensure the reactor contents remain at 60° C. to 80° C. throughout the addition. The method may optionally further comprise recovering the polyorganohydrogensiloxane crosslinker by any convenient means, such as stripping and/or distillation with heat and optionally with reduced pressure, to remove unreacted starting materials and by-products. Furthermore, Reference Example 1 below shows a procedure for making a polyorganohydrogensiloxane crosslinker suitable for use as starting material B).

The amount of starting material B) in the silicone release coating composition depends on various factors including the aliphatically unsaturated group content of starting material A) and the type and amount of hydrosilylation reaction catalyst, and the type and amount of inhibitor. However, starting materials A) and B) are present in amounts sufficient to provide a molar ratio of silicon bonded aliphatically unsaturated groups in starting material A) to silicon bonded hydrogen atoms in starting material B) (SiH/Vi ratio) of 1.5 to 2.5. The amount of starting material B) may be 50% to 65% based on combined weights of all starting materials in the silicone release coating composition, alternatively 55% to 60%, on the same basis.

Starting Material C) Hydrosilylation Reaction Catalyst

The silicone release coating composition described herein further comprises starting material (C) a hydrosilylation reaction catalyst. Hydrosilylation reaction catalysts are known in the art and are commercially available. Hydrosilylation reaction catalysts include C-i) platinum group metal catalysts. Such hydrosilylation reaction catalysts can be a metal selected from platinum, rhodium, ruthenium, palladium, osmium, and iridium. Alternatively, the hydrosilylation reaction catalyst may be a C-ii) compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane] dichlorodirhodium, chloroplatinic acid (Speier's Catalyst), chloroplatinic acid hexahydrate, platinum dichloride, and C-iii) complexes of said compounds with low molecular weight organopolysiloxanes or C-iv) platinum group metal compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). Alternatively, the hydrosilylation reaction catalyst may be C-v) a complex, as described above, microencapsulated in a resin matrix. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation of Midland, Michigan, USA. Alternatively, starting material C) may comprise 1,3-diethenyl-1,1,3,3-tetramethyldisiloxane complexes with platinum.

The amount of hydrosilylation reaction catalyst used herein will depend on various factors including the selection of starting materials A) and B) and their respective contents of silicon bonded hydrogen atoms and aliphatically unsaturated groups and the content of the platinum group metal in C) the hydrosilylation reaction catalyst selected, however, the amount of hydrosilylation reaction catalyst is sufficient to catalyze hydrosilylation reaction of SiH and aliphatically unsaturated groups, alternatively the amount of catalyst is sufficient to provide 1 ppm to 6,000 ppm of the platinum group metal based on combined weights of starting materials containing silicon bonded hydrogen atoms and aliphatically unsaturated hydrocarbon groups; alternatively 1 ppm to 1,000 ppm, alternatively >0 ppm to 200 ppm, alternatively 1 ppm to 100 ppm, and alternatively 10 ppm to 60 ppm, on the same basis.

Starting Material D) Hydrosilylation Reaction Inhibitor

The silicone release coating composition further comprises starting material D), a hydrosilylation reaction inhibitor (inhibitor) that may optionally be used for altering rate of reaction of the silicon bonded hydrogen atoms of starting material B) and the aliphatically unsaturated hydrocarbon groups of stating material A), as compared to reaction rate of the same starting materials but with the inhibitor omitted. Inhibitors are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; olefinic siloxanes such as cycloalkenylsiloxanes exemplified by methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; and a combination thereof. Exemplary olefinic siloxanes are disclosed, for example, in U.S. Pat. No. 3,989,667. Exemplary acetylenic alcohols are disclosed, for example, in U.S. Pat. No. 3,445,420.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy) dimethylsilane, bis(3-methyl-1-butyn-3-oxy)silanemethylvinylsilane, bis((1,1-dimethyl-2-propynyl)oxy) dimethylsilane, methyl(tris(1,1-dimethyl-2-propynyloxy)) silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy) trimethylsilane, (3-phenyl-1-butyn-3-oxy) diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the silylated acetylenic compound is exemplified by methyl(tris (1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,740 discloses silylating an acetylenic alcohol described above by reacting it with a chlorosilane in the presence of an acid receptor.

The amount of inhibitor added herein will depend on various factors including the desired reaction rate, the particular inhibitor used, and the selection and amount of starting materials A) and B). However, the hydrosilylation reaction inhibitor may be present in the silicone release coating composition in an amount sufficient to provide an inhibitor:Pt group metal molar ratio of 10:1 to 200:1, alternatively 15:1 to 40:1.

Starting Material E) Anti-Mist Additive

The silicone release coating composition described herein may optionally further comprise starting material E), an anti-mist additive. The anti-mist additive may be any compound or component suitable for reducing, minimizing, or eliminating misting during applications of the composition.

Starting material E) the anti-mist additive may comprise an anti-mist organopolysiloxane. The anti-mist organopolysiloxane is different from the other starting materials of the silicone release coating composition. The E) anti-mist additive may comprise a Q-branched dimethylvinyl terminated organopolysiloxane. The E) anti-mist additive may have a viscosity of from 30,000 mPa·s to 50,000 mPa·s, alternatively from 35,000 mPa·s to 45,000 mPa·s at 25° C.

For example, the anti-mist additive may be a polyorganosiloxane comprising unit formula: $(R^5_3SiO_{1/2})_h$ $(R^5_2SiO_{2/2})_i(R^5_2R^6SiO_{1/2})_j(SiO_{4/2})_k$, where each $R^5$ is an independently selected monovalent hydrocarbon group free of aliphatic unsaturation (e.g., alkyl as described above for $R^M$), each $R^6$ is an independently selected monovalent aliphatically unsaturated hydrocarbon group (e.g., alkenyl or alkynyl as described above for $R^U$), subscript h>0, subscript i>0, subscript j>0, subscript k>0, and a quantity (h+i+j+k) has a value sufficient to provide the branched polyorganosiloxane with the viscosity described above. Alternatively, starting material E) may comprise a vinyldimethylsiloxy functionalized polysiloxane. Suitable anti-mist additives and methods for their preparation are known in the art, for example, in U.S. Patent Application 2011/0287267; U.S. Pat. Nos. 8,722,153; 6,805,914; 6,586,535; 6,489,407; and 5,625,023.

When starting material E) is present, the silicone release coating composition may comprise 0 to <10%, alternatively >0% to 2%, of the anti-mist additive based on combined weights of all starting materials in the silicone release coating composition.

Starting Material F) Anchorage Additive

The silicone release coating composition may optionally further comprise starting material F), an anchorage additive. Without wishing to be bound by theory, it is thought that the anchorage additive will facilitate bonding to a substrate by a release coating prepared by curing the silicone release coating composition described herein.

Suitable anchorage additives include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilyl)hexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-glycidoxypropyltrimethoxysilane, 3-glycidoxypropyltriethoxysilane, 2-(3,4-epoxycyclohexyl)ethyltrimethoxysilane or 3-methacryloxypropyltrimethoxysilane.

Alternatively, the anchorage additive may be exemplified by a reaction product of an alkenyl-functional alkoxysilane (e.g., a vinyl alkoxysilane) and an epoxy-functional alkoxysilane; a reaction product of an alkenyl-functional acetoxysilane (such as vinyl acetoxysilane) and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Pat. No. 9,562,149; U.S. Patent Application Publication Numbers 2003/0088042, 2004/0254274, 2005/0038188, 2012/0328863 at paragraph [0091], and U.S. Patent Publication 2017/0233612 at paragraph [0041]; and EP 0 556 023.

Anchorage additives are commercially available. For example, SYL-OFF™ 297, SYL-OFF™ 397, and SYL-OFF™ 9176 are available from Dow Silicones Corporation of Midland, Michigan, USA. Other exemplary anchorage additives include (F-1) vinyltriacetoxysilane, (F-2) glycidoxypropyltrimethoxysilane, (F-3) a combination of (F-1) and (F-2), (F-4) a combination of (F-3) and a polydimethylsiloxane terminated with hydroxyl groups, methoxy groups, or terminated with both a hydroxy group and a methoxy group, and (F-5) 2-(3,4-epoxycyclohexyl)ethyltrimethoxysilane. The combinations (F-3) and (F-4) may be physical blends and/or reaction products.

The amount of anchorage additive depends on various factors including the type of substrate to which the silicone release coating composition will be applied and whether a primer or other surface treatment will be used before application of the silicone release coating composition. However, the amount of anchorage additive may be 0 to <10%, alternatively 0 to 5%, alternatively 1% to 5%, alternatively 1% to 3%, and alternatively 1.9% to 2.1%, based on combined weights of all starting materials in the silicone release coating composition.

Starting Material G) Solvent

The silicone release coating composition may optionally further comprises starting material G), a solvent. Suitable solvents include, polyalkylsiloxanes, alcohols, ketones, aromatic hydrocarbons, aliphatic hydrocarbons, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Michigan, U.S.A.

Alternatively, starting material G) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the silicone release coating composition. However, the amount of solvent may be 0% to <10%, based on combined weights of all starting materials in the silicone coating composition. The solvent may be added during preparation of the silicone release coating composition, for example, to aid mixing and delivery of one or more starting materials. For example, the catalyst may be delivered in a solvent. All or a portion of the solvent may optionally be removed after the silicone release coating composition is prepared. Alternatively, a customer may dilute the silicone release coating composition after receipt and before use, and in this instance the amount of solvent for dilution may be ≥10%.

Other optional starting materials which may also be added to the silicone release coating composition described herein include, for example, reactive diluents, fragrances, preservatives and fillers, for example, silica, quartz or chalk.

Alternatively, the silicone release coating composition may be free of filler or contains only a limited amount of filler, such as 0 to 30% by weight of the silicone release coating composition. Fillers can agglomerate or otherwise stick to the coater equipment used to apply the silicone release coating composition to a substrate. Fillers can also hinder optical properties, for example transparency, of the release coating and of the release liner formed therewith. The fillers may be prejudicial to the adherence of an adherend, such as a pressure sensitive adhesive adhered to a release coating prepared by curing the silicone release coating composition.

The silicone release coating composition may be free of conventional release modifiers that have been used in the past to control (decrease) the level of release force (the adhesive force between the release coating and an adherend thereto, such as a label including a pressure sensitive adhesive). Examples of such release modifiers include trimethylsiloxy-terminated dimethyl, phenylmethylsiloxanes. Without wishing to be bound by theory, it is thought that including a trimethylsiloxy-terminated dimethyl, phenylmethylsiloxanes in a release coating composition may lower subsequent adhesion strength and/or increase migration of the release coatings prepared therefrom. Therefore, the polyorganosiloxane release coating composition described herein may be free of polyorganosiloxanes that contain silicon bonded aryl groups (e.g., silicon bonded phenyl groups) other than starting materials A) and B) described herein.

The silicone release coating composition may be free from fluoroorganosilicone compounds. It is believed that, during the cure, a fluorocompound, because of its low surface tension, will rapidly migrate to the interface of a coating composition and a substrate, for example a polyorganosiloxane release coating composition/PET film interface, and prevent adherence of the release coating (prepared by curing the polyorganosiloxane release coating composition) to the substrate by making a fluorine containing barrier. By making a barrier, the fluorocompound prevents any component from reacting at the interface. Moreover, fluorosilicone compounds are usually expensive.

Method of Making Release Coating Composition and Release Liner

The silicone release coating composition described herein may be prepared by mixing the starting materials together, for example, to prepare a one part composition. Mixing may be performed under ambient conditions (e.g., RT and ambient pressure). However, it may be desirable to prepare the polyorganosiloxane release coating composition as a multiple part composition, in which the crosslinker and catalyst are stored in separate parts, until the parts are combined at the time of use (e.g., shortly before application to a substrate).

For example, a multiple part polyorganosiloxane release coating composition may comprise:

Part (A) a base part comprising the starting materials having silicon bonded alkenyl groups, i.e., starting material A) and starting material D) the hydrosilylation reaction catalyst, and when present, E) the anti-mist additive, and Part (B) a curing agent part comprising starting material A) the polydiorganosiloxane and B) the polyorganohydrogensiloxane (crosslinker). Starting material D), the hydrosilylation reaction inhibitor may be added to either Part (A), Part (B), or both. Starting material F), the anchorage additive, can be incorporated in either of Part (A) or Part (B), or it can be added in a separate (third) part. When present, starting material G), the solvent, may be added to Part (A), Part (B), or both. Part (A) and Part (B) may be combined in a weight ratio (A):(B) of 1:1 to 10:1, alternatively 1:1 to 5:1, and alternatively 1:1 to 2:1. Part (A) and Part (B) may be provided in a kit with instructions for how to combine the parts to prepare the silicone release coating composition and/or how to apply the silicone release coating composition to a substrate.

A method for forming a release liner comprises:
1) combining starting materials comprising A), B), C), and D), and optionally one or more of E), F), and G), thereby the silicone release coating composition as described above; and
2) applying the silicone release coating composition to a surface of a substrate.

The silicone release coating composition can for example be applied to the surface of the substrate by any convenient means such as spraying, doctor blade, dipping, screen printing or roll coating, by a roll coater, e.g., an offset web coater, kiss coater or etched cylinder coater.

The silicone release coating composition can be applied to a surface of any substrate, such as polymer film substrates, for example polyester, particularly polyethylene terephthalate (PET), polyethylene, polypropylene, or polystyrene films. The silicone release coating composition can alternatively be applied to a paper substrate, including plastic coated paper, for example paper coated with polyethylene, glassine, super calender paper, or clay coated kraft. The silicone release coating composition can alternatively be applied to a metal foil substrate, for example aluminum foil.

The method may further comprise: 3) treating the surface of the substrate before coating the silicone release coating composition on the surface of the substrate. Treating the surface of the substrate may be performed by any convenient means such as a plasma treatment or a corona discharge treatment. Alternatively, the surface of the substrate may be treated by applying a primer. In certain instances anchorage of the release coating may be improved if the surface of the substrate is treated before coating.

The method may further comprise: 4) removing solvent (if solvent is present), which may be performed by any conventional means, such as heating at 50° C. to 100° C. for a time sufficient to remove all or a portion of the solvent. The method may comprises: 5) curing the silicone release coating composition to form a release coating on the surface of the substrate. Curing may be performed by any conventional means such as heating at 100° C. to 200° C.

Under production coater conditions cure can be affected in a residence time of 1 second to 60 seconds, alternatively 10 seconds to 60 seconds, alternatively 1 seconds to 30 seconds, alternatively 1 second to 6 seconds, and alternatively 1.5 seconds to 3 seconds, at an air temperature of 120° C. to 160° C. Heating for steps 4) and/or 5) can be performed in an oven, e.g., an air circulation oven or tunnel furnace or by passing the coated film around heated cylinders.

The coat weight of the release coating may be 0.3 g/m² to 1.5 g/m², alternatively 0.6 g/m² to 1.3 g/m². Without wishing to be bound by theory, one benefit of the release coating described herein is the ability to provide high release immediate force, e.g., 50 g/in at 30 minutes, as tested by the method in Reference Example 4, below.

The release liner prepared using the silicone release coating composition described above is suitable for use in processes for making structural composites, such as aircraft parts. Multi-layer, fiber re-enforced prepregs are used to make such structural composites. The different prepreg layers are pre-assembled, and then molded to shape under vacuum and heat. More than one release liner prepared as described herein may be used at varying stages during prepreg assembly, lay up, and curing steps. And, release liners prepared as described herein may be re-used multiple times.

The matrix system of the prepreg is tacky before cure. The matrix that supports the fiber layers and subsequently bonds them to form composite material is commonly epoxy, phenolic, bismaleimide/polyimide, and cyanurate-based thermoset resins. Therefore, a release liner prepared as described herein can be used to hold the prepreg in place during transport and storage. Also, at the layup stage, a transfer liner with high immediate release force prepared as described herein may also be used to transfer the prepreg to the layup machine.

EXAMPLES

These examples are intended to illustrate the invention to one skilled in the art and are not to be interpreted as limiting the scope of the invention set forth in the claims. The materials in Table 1 were used in these examples.

TABLE 1

| Starting Material | Description | Commercial Name or Source |
|---|---|---|
| Polymer a1 | bis-trimethylsiloxy terminated poly(hexenylmethyl/ alphamethylstyrenyl-methyl)siloxane with vinyl content = 3.8%. unit formula $MD_{6.43}{}^{Hex}D_{19.57}{}^{AMSM}$, where M has formula $(Me_3SiO_{1/2})$; $D^{Hex}$ has formula $(MeRSiO_{2/2})$; $D^{AMS}$ has formula $(MeR'SiO_{2/2})$, where R represents a hexenyl group and R' represents a group of formula 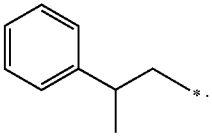 | Reference Example 1 |
| Polymer a2 | branched polyorganosiloxane comprising units of formulae $(ViMe_2SiO_{1/2})$, $(Me_2SiO_{2/2})$, and $(SiO_{4/2})$ and having a vinyl content = 0.625% and DP = 220 DP. | 2-7751 INT Dow Silicones Corporation |
| Polymer a3 | bis-trimethylsiloxy-terminated poly(methylhexenyl/methyloctyl)siloxane having unit formula $(Me_3SiO_{1/2})_2(MeRSiO_{2/2})_{5.72}(MeR"SiO_{2/2})_{20.28}$, where R" = octyl. | Reference Example 1 |
| Polymer a4 | bis-vinyldimethylsiloxy terminated polydimethylsiloxane with DP = 150, vinyl content = 0.45%, and Mn = 11,500 g/mol measured by GPC | SILASTIC™ SFD-119 |
| Crosslinker b1 | bis-trimethylsiloxy terminated poly(methylhydrogen/ methylalphamethylstyrenyl)siloxane with an SiH content = 0.19% having unit formula $MD_{7.13}{}^{H}D_{18.71}{}^{AMSM}$, where M has formula $(Me_3SiO_{1/2})$; $D^H$ has formula $(MeHSiO_{2/2})$; $D^{AMS}$ has formula $(MeR'SiO_{2/2})$, where R' represents a group of formula 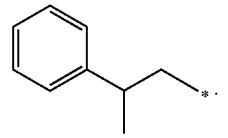 | |
| Crosslinker b2 | trimethylsiloxy-terminated poly(dimethyl/methylhydrogen)siloxane and trimethylsiloxy-terminated polymethylhydrogensiloxane | SYL-OFF™ 7682-055 |
| Crosslinker b3 (7136XL) | trimethylsiloxy-terminated polymethylhydrogensiloxane and methylhydrogencyclosiloxanes | SYL-OFF™ 7136 High Speed Crosslinker |

TABLE 1-continued

| Starting Material | Description | Commercial Name or Source |
|---|---|---|
| Crosslinker b4 | trimethylsiloxy-terminated polymethylhydrogensiloxane | SYL-OFF™ 7682-000 |
| Catalyst c1 | Karstedt's catalyst | 4000 |
| Inhibitor d1 (ETCH) | 1-ethynyl-1-cyclohexanol | |
| Inhibitor d2 (DAM) | diallyl maleate | |
| Anti-Mist Additive e1 | vinyldimethylsiloxy functionalized polysiloxane having vinyl content = 0.16% and viscosity of 40,000 cP (what was the test method that gave this viscosity?) | Dow Silicones Corporation |
| Release modifier 1 | Dimethylvinylated and trimethylated silica and 1-tetradecene | SYL-OFF™ 40 Release Modifier |

DOWSIL™, SILASTIC™, AND SYL-OFF™ branded materials are commercially available from Dow Silicones Corporation of Midland, Michigan, USA.

Reference Example 1—Preparation of Phenyl-Isopropyl-Functional Polyorganosiloxanes Polymer a3 in Table 1, above, was prepared as follows: First, an octyl-functional siloxane was prepared in a 5 L three neck round bottom flask equipped with mechanical mixer, thermocouple, heating mantle, condenser, and addition funnel. To the flask, SYL-OFF™ 7682-000 Crosslinker was added (1325.99 g) and heated to 55° C. under a nitrogen blanket. 1-Octene (1674.2 g, split between 16 additions over 10 hours) was added to the flask through an addition funnel. After 30 g of the 1-octene was added, the mixture was catalyzed with a 600 μL dose of 1.0% Karstedt's catalyst in isopropanol, whereupon an exotherm was observed. The 1-octene continued to be added to the flask at a rate such that the exotherm maintained a pot temperature of 75° C. for the entirety of the reaction. An additional 300 μL dose of catalyst was required after 1-octene addition #12. The reaction mixture was held at 75° C. for an additional two hours. The final sample was analyzed by FTIR (SiH peak at 2150 cm-1), and GPC, according to the test methods described below.

Second, a 5 L three neck round bottom flask was equipped with mechanical mixer, thermocouple, heating mantle, condenser, and addition funnel. To the flask, 1,5-hexadiene (1100 g) was added and heated to 50° C. under a nitrogen blanket. The octyl-functional siloxane prepared as described above (1660.0 g, split between 13 additions over 15 hours) was added to the flask through an addition funnel. After 30 g of this siloxane was added, the mixture was catalyzed with a 600 μL dose of 1.0% Karstedt's catalyst in isopropanol. No exotherm was observed due to great dilution in solvent. The reaction was tracked by FTIR and loss of SiH at 2150 cm$^{-1}$. The siloxane continued to be added to the flask at a rate such that the exotherm maintained a pot temperature of 50-55° C. for the entirety of the reaction. An additional 200 μL dose of catalyst was added after the final addition of siloxane. The reaction mixture was held at 50° C. for an additional four hours. Residual hexadiene was removed by batch stripping on a rotary evaporator (60° C., 80 RPM, <20 mbar) for 3 to 4 hours. The final sample was analyzed by FTIR (SiH peak at 2150 cm$^{-1}$), and GPC. Final viscosity was 511 mPa·s as measured according to the test method for viscosity described below.

Crosslinker b1 described above in Table 1 was prepared as follows: A 2 L three neck round bottom flask was equipped with mechanical mixer, thermocouple, heating mantle, condenser, and addition funnel. To the flask, SYL-OFF™ 7682-000 Crosslinker was added (397.81 g) and heated to 60° C. Alpha methylstyrene (502.44 g, split between 8 additions over 6 hours) was added to the flask through an addition funnel. Before the first aliquot of alpha methylstyrene was added and after each consecutive addition, the mixture was catalyzed with a 100 μL dose of 1.0% Karstedt's catalyst in isopropanol, with each dose exhibiting an exotherm, and the final reaction mixture having 12 ppm Pt. The rate of addition of alpha methylstyrene was such that the exotherm maintained a pot temperature of 70° C. for the entirety of the reaction (7 h). The final SiH content was 1947 ppm measured by FTIR at 2150 cm$^{-1}$, and final viscosity was 1299 mPa·s, both measured according to the test methods described below.

Polymer a1 described in Table 1, above, was prepared as follows: A 1 L three neck round bottom flask was equipped with mechanical mixer, thermocouple, heating mantle, condenser, and addition funnel. To the flask, 1,5-hexadiene (481.3 g split into 4 aliquots to maintain solvent level 45%) was added and heated to 50° C. The addition of crosslinker b1 prepared as described above (458.70 g, 1947 ppm SiH) was added slowly to the flask in 7 aliquots through an addition funnel at about 1 mL/min. The reaction mixture was initially catalyzed with 200 μL of a 1% Karstedt's catalyst solution in isopropanol, and again catalyzed after 25 hours. Reaction progress was tracked by concentration of Si—H bond through FTIR analysis at 2150 cm$^{-1}$. Overall reaction time spanned 104 h with a final stripping step at 60° C., <15 mbar for 3 h. Final SiH content was 6 ppm, and final viscosity was 2926 mPa·s measured by the test methods described below.

Reference Example 2—General Procedure for Preparing Samples of Release Coating Compositions Starting materials shown in Table 1: Polymer, Inhibitor, Anti-Mist Additive, release modifier (if present), and Crosslinker were added to a container. The starting materials were mixed either by hand shaking or by overhead mixing at 1400 rpm, depending on batch size. Catalyst was last. Once catalyzed, the sample was coated on a liner substrate within 30 minutes. Amounts of each starting material, in weight parts, are shown below in Table 2.

Reference Example 3—General Procedure for Coating Release Coating Samples on Liner Substrates Each sample prepared as described in Reference Example 2 was coated on a paper liner using an Euclid coater. Coat weight was measured using an Oxford Instruments Lab-X 3500 Benchtop XRF analyzer or Rigaku NEX QC+ XRF analyzer, paper mode. Each coated liner passed through an oven at 360° F. set temperature for 8 s to 12 s.

Reference Example 4—General Procedure for Measuring Release Force

Three strips of Tesa™ 7475 tape were each laminated on a hand sheet coated with a release coating sample prepared according to Reference Example 3, followed by three passes of a 3 pound roller. After the laminate sat under weight for specified amount of time, the laminate was cut into 1 inch strips. Release force was measured using a TMI adhesion tester, pull label from liner 180°, at 300 inch per minute. An average release force from three strips was reported for each sample. Results are reported in g/in and are shown in Table 2, below.

TABLE 3

Abbreviations

| Abbreviation | Definition |
| --- | --- |
| AMS | 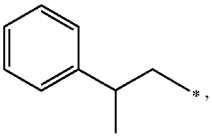 where * denotes a point of attachment |
| ° C. | degrees Celsius |
| DP | degree of polymerization |
| FTIR | Fourier Transform Infra Red |
| g | grams |
| GPC | gel permeation chromatography measured according to the test method described below |

TABLE 2

| Sample | Working 1 (F31) | C1 | C2 | C3 | C4 | C5 | C6 | C7 | C8 (F4) |
| --- | --- | --- | --- | --- | --- | --- | --- | --- | --- |
| Polymer a1 | 40.4 | 0 | 0 | 0 | 0 | 0 | 0 | 0 | 0 |
| Polymer a2 | 0 | 483 | 457 | 431 | 378 | 440 | 397 | 310 | 0 |
| Polymer a3 | 0 | 0 | 0 | 0 | 0 | 25 | 50 | 100 | 0 |
| Polymer a4 | 0 | 0 | 0 | 0 | 0 | 0 | 0 | 0 | 94 |
| Crosslinker b1 | 58.4 | 0 | 0 | 0 | 0 | 0 | 0 | 0 | 0 |
| Crosslinker b2 | 0 | 11.7 | 13.0 | 14.5 | 17.5 | 30.0 | 48.5 | 85.0 | 0 |
| Crosslinker b3 | 0 | 0 | 0 | 0 | 0 | 0 | 0 | 0 | 2.7 |
| Catalyst c1 | 1.1 | 3.95 | 3.85 | 3.85 | 3.85 | 3.85 | 3.85 | 3.95 | 1.2 |
| Inhibitor d1 | 0 | 1.21 | 1.14 | 1.08 | 0.94 | 1.16 | 1.12 | 1.03 | 0 |
| Inhibitor d2 | 0.2 | 0 | 0 | 0 | 0 | 0 | 0 | 0 | 0.2 |
| Anti-Mist Additive e1 | 0 | 0 | 0 | 0 | 0 | 0 | 0 | 0 | 2 |
| Release modifier 1 | 0 | 0 | 25 | 50 | 100 | 0 | 0 | 0 | 0 |
| SiH:Vi Ratio | 2.0 | 1.2 | 1.2 | 1.2 | 1.2 | 2.6 | 3.6 | 4.9 | 2.0 |
| ppm Pt | 60.0 | 41.0 | 40.0 | 40.0 | 40.0 | 40.0 | 40.0 | 41.0 | 60.0 |
| Release Force (immediate) | 82 | 11 | 12 | 14 | 18 | 12 | 14 | 13 | 12 |
| Release Force (24 hr) | 225 | 15 | 19 | 22 | 31 | 32 | 178 | 511 | 16 |

INDUSTRIAL APPLICABILITY

The inventors surprisingly found that the silicone release coating composition described herein cures to form a release coating having high immediate release force (e.g., release force >50 g/in within 30 minutes after application of an adherend as tested by the method in Reference Example 4). This is in contrast to the release coating compositions in the comparative examples, which cured to form release coatings with much lower immediate release force.

Definitions and Usage of Terms

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 3.

TABLE 3-continued

Abbreviations

| Abbreviation | Definition |
| --- | --- |
| h | hours |
| Hex | hexenyl |
| Me | methyl |
| mg | milligrams |
| mbar | millibar |
| mL | milliliters |
| mm | millimeters |
| mPa · s | milliPascal seconds |
| RPM | revolutions per minute |
| RT | room temperature of 20° C. to 25° C. |
| s | seconds |
| THF | tetrahydrofuran |
| μL | microliters |
| μm | micrometers |
| Vi | vinyl |

"Aryl" means an unsaturated aromatic carbocyclic group, which may have of 6 to 14 carbon atoms, and which may have a single ring (e.g., phenyl) or multiple condensed rings (e.g., naphthyl or anthryl).

"Alkylene" means a divalent saturated hydrocarbon group, which may have from 1 to 10 carbon atoms, alternatively 1 to 6 carbon atoms. "Alkylene" is exemplified by groups such as methylene ($-CH_2-$), ethylene ($-CH_2-CH_2-$), and the propylene isomers (e.g., $-CH_2-CH_2-CH_2-$ and $-CH(CH_3)CH_2-$).

"Alkaryl" means -alkylene-aryl groups, which may have 1 to 10 carbon atoms in the alkylene moiety and 6 to 10 carbon atoms in the aryl moiety. Such alkaryl groups are exemplified by -benzyl, aryl-isopropyl groups such as phenyl-isopropyl-, and -ethyl-benzyl.

The following test methods were used to measure properties of the starting materials herein.

Viscosity of each polydiorganosiloxane was measured at 1.0 to 250 RPM on a Brookfield DV-III Ultra cone & plate viscometer with #CP-52 spindle. One skilled in the art would recognize that rotation rate decreases as viscosity increases and would be able to select the appropriate rotation rate when using this test method to measure viscosity.

For comparative examples (containing starting materials without an alkaryl group), the following GPC conditions were used.

| | |
|---|---|
| Sample Prep: | 5 mg/mL in eluent; solvated 3 h with occasional shaking; samples filtered through 0.45 μm PTFE syringe filters prior to injection |
| Pump: | Waters 515 at a nominal flow rate of 1.0 mL/min |
| Eluent: | HPLC grade toluene available from Millipore Sigma of St. Louis, MO, USA |
| Injector: | Waters 717 100 μL injection |
| Columns: | Two (300 mm × 7.5 mm) Polymer Laboratories PL gel 5 μm Mixed-C columns, preceded by a PLgel 5 μm guard column (50 mm × 7.5 m) at 45° C. |
| Detection: | Waters 2410 differential refractive index detector at 45° C. |
| Data system: | Atlas 8.3, Cirrus 2.0 |
| Calibration: | Relative to 14 narrow polystyrene standards covering the range of 580 g/mole to 2,300,000 g/mole, fit to a third order polynomial curve |

For examples (containing starting materials with an alkaryl group), the following GPC conditions were used.

| | |
|---|---|
| Sample Prep: | 5 mg/mL in eluent; solvated 3 h with occasional shaking; samples filtered through 0.45 μm PTFE syringe filters prior to injection |
| Pump: | Waters 2695 at a nominal flow rate of 1.0 mL/min |
| Eluent: | Certified grade THF available from Millipore Sigma of St. Louis, MO, USA |
| Injector: | Waters 717 100 μL injection |
| Columns: | Two (300 mm × 7.5 mm) Polymer Laboratories PLgel 5 μm Mixed-C columns, preceded by a PLgel 5 μm guard column (50 mm × 7.5 m) at 35° C. |
| Detection: | Waters 2410 differential refractive index detector at 35° C. |
| Data system: | Atlas 8.3, Cirrus 2.0 |
| Calibration: | Relative to 16 narrow polystyrene standards covering the range of 580 g/mole to 2,300,000 g/mole, fit to a third order polynomial curve |

$^{29}$Si NMR and $^{13}$C NMR spectroscopy can be used to quantify the R group (e.g., $R^1$, $R^2$, and/or $R^3$) group content in a polydiorganosiloxane. A $^{29}$Si NMR spectrum should be acquired using the methodology outlined by Taylor et. al. in Chapter 12 of *The Analytical Chemistry of Silicones*, ed. A. Lee Smith, Vol. 112 in Chemical Analysis, John Wiley & Sons, Inc. (1991), pages 347-417, and section 5.5.3.1. In this chapter, the authors discuss general parameters unique to acquiring quantitative NMR spectra from Silicon nuclei. Each NMR spectrometer is different with respect to the electronic components, capabilities, sensitivity, frequency and operating procedures. One should consult instrument manuals for the spectrometer to be used in order to tune, shim and calibrate a pulse sequences sufficient for quantitative 1D measurement of $^{29}$Si and $^{13}$C nuclei in a sample.

A key output of a NMR analysis is the NMR spectrum. Without standards, it is recommended that the signal to noise ratio of signal height to average baseline noise be no less than 10:1 to be considered quantitative. A properly acquired and processed NMR spectrum results in signals that can be integrated using any commercially available NMR processing software package.

From these integrations, the weight percent of total R group content can be calculated from the $^{29}$Si NMR spectrum according to the following: $(I^M) \cdot (U^M) = G^M$; $(I^{M(R)}) \cdot (U^{M(R)}) = G^{M(R)}$; $(I^D) \cdot (U^D) = G^D$; $(I^{D(R)}) \cdot (U^{D(R)}) = G^{D(R)}$; $U^R/U^{M(R)} = Y^{R'}$; $U^R/U^{D(R)} = Y^{R''}$; $Y^{R'''} \cdot [G^{M(R)}/(G^M + G^{M(R)} + G^D + G^{D(R)}) \cdot 100] = W^{R'}$; $Y^{R'''} \cdot [G^{D(R)}/(G^M + G^{M(R)} + G^D + G^{D(R)}) \cdot 100] = W^{R''}$; and $W^{R'} + W^{R''} = $ TOTAL $W^R$; where I is the integrated signal of the indicated siloxy group; U is the unit molecular weight of the indicated siloxy group; G is a placeholder representing the grams unit; W is the weight percent of the indicated siloxy unit; Y is a ratio value for the specified siloxy unit; R is as described above; R' represents R groups only from M(R); and R" represents R groups only from D(R) groups.

FT-IR analysis was completed using a Perkin Elmer Frontier FT-IR with a 0.5 mm NaCl cell. Total absorbance between 600 and 4000 was detected for 16 scans. Sample preparation was 2-10% sample in tetrachloroethylene, and the peak of interest is 2150 cm$^{-1}$ (for pendant SiH). To quantify SiH in the sample, the background spectra was subtracted and the target peak integrated area was entered into a calibration table made with the cell and various known concentrations of SiH in siloxanes.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and/or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18" may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

The invention claimed is:
1. A silicone release coating composition comprising: 35 weight % to 45 weight % of A) a polydiorganosiloxane of unit formula $(R^M_3SiO_{1/2})_2$ $(R^M R^U SiO_{2/2})_a$ $(R^M R^A$

SiO$_{2/2}$)$_b$, where R$^M$ is an alkyl group of 1 to 6 carbon atoms, R$^U$ is an aliphatically unsaturated hydrocarbon group of 2 to 16 carbon atoms, and R$^A$ is an alkaryl group of formula

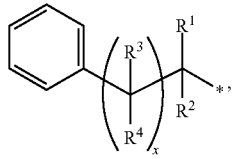

where each of R$^1$, R$^2$, R$^3$ and R$^4$ is independently selected from the group consisting of hydrogen and an alkyl group of 1 to 6 carbon atoms, with the proviso that at least 1 instance of R$^3$ and/or R$^4$ is the alkyl group, subscript x is 1 to 6, and * denotes a point of attachment (where the alkaryl group bonds to a silicon atom), and subscripts a and b have values such that the polydiorganosiloxane comprises 30 weight % to 95 weight % of groups R$^A$;

50 weight % to 65 weight % of B) a polyorganohydrogensiloxane crosslinker of unit formula (R$^M_3$SiO$_{1/2}$)$_2$ (R$^M$HSiO$_{2/2}$)$_c$(R$^M$R$^A$SiO$_{2/2}$)$_d$, subscripts c and d have values such that the polyorganohydrogensiloxane comprises 30 weight % to 95 weight % of groups R$^A$ and has at least 3 silicon bonded hydrogen atoms per molecule;

with the proviso that starting materials A) and B) are present in amounts sufficient to provide a molar ratio of silicon bonded aliphatically unsaturated groups in starting material A) to silicon bonded hydrogen atoms in starting material B) (SiH/Vi ratio) of 1.5 to 2.5;

C) a hydrosilylation reaction catalyst, present in an amount sufficient to provide >0 ppm to ≤6,000 ppm Pt group metal based on combined weights of starting materials A), B), C) and D) (alternatively 60 ppm);

D) a hydrosilylation reaction inhibitor in an amount sufficient to provide an inhibitor:Pt group metal molar ratio of 10:1 to 200:1;

0 to <10 weight % of E) an anti-mist additive;
0 to <10 weight % of F) an anchorage additive; and
0 to <10 weight % of G) a solvent;

where amounts of starting materials A), B), C) and D) combined total >90 weight % to 100 weight % the silicone release coating composition; and
amounts of starting materials E), F) and G) combined total 0 to <10 weight % of all starting materials in the silicone release coating composition.

2. The composition of claim 1, where in starting material A), the polydiorganosiloxane, each R$^M$ is a methyl group, each R$^U$ is a hexenyl group, each R$^A$ is

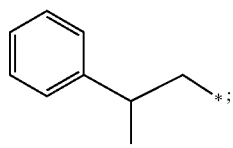 [SMILES: *CC(C)c1ccccc1]

subscript a has an average value of 5 to 7 and subscript b has an average value of 19 to 20.

3. The composition of claim 1, where in starting material B), the polyorganohydrogensiloxane, each R$^A$ is

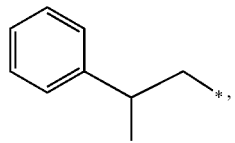 [SMILES: *CC(C)c1ccccc1]

subscript c has an average value of 7 to 8 and subscript d has an average value of 18 to 19.

4. The composition of claim 1, where starting material C) comprises 1,3-diethenyl-1,1,3,3-tetramethyldisiloxane complexes with platinum.

5. The composition of claim 1, where starting material D) is selected from the group consisting of ethynyl cyclohexanol, diallyl maleate, and a combination thereof.

6. The composition of claim 1, where starting materials A) to D) comprise 100% of the composition.

7. The composition of claim 1, where starting material E) is present, and starting material E) comprises a vinyldimethylsiloxy functionalized polysiloxane.

8. The composition of claim 7, where starting materials A to E) comprise 100% of the composition.

9. The composition of claim 1, where starting material F) is present, and starting material F) is selected from the group consisting of (F-1) vinyltriacetoxysilane, (F-2) glycidoxypropyltrimethoxysilane, (F-3) a combination of (F-1) and (F-2), and (FG-4) a combination of (F-3) and a polydimethylsiloxane terminated with hydroxyl groups, methoxy groups, or terminated with both a hydroxy group and a methoxy group.

10. A method for preparing a release liner comprising:
optionally 1) pre-treating a surface of a substrate,
2) coating the composition of claim 1 on the surface of the substrate,
optionally 3) removing all of a portion of the solvent, if present, and
4) curing the composition, thereby forming a release coating on the substrate.

11. A polydiorganosiloxane having unit formula (R$^M_3$SiO$_{1/2}$)$_2$ (R$^M$R$^U$SiO$_{2/2}$)$_a$(R$^M$R$^A$SiO$_{2/2}$)$_b$, where R$^M$ is an alkyl group of 1 to 6 carbon atoms, R$^U$ is an aliphatically unsaturated hydrocarbon group of 2 to 16 carbon atoms, and R$^A$ is an alkaryl group of formula

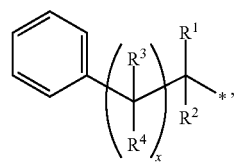

where each of R$^1$, R$^2$, R$^3$ and R$^4$ is independently selected from the group consisting of hydrogen and an alkyl group of 1 to 6 carbon atoms, with the proviso that at least 1 instance of R$^3$ and/or R$^4$ is the alkyl group and * denotes a point of attachment (where the alkaryl group bonds to a silicon atom), subscript x is 1 to 6, and subscripts a and b have values such that the polydiorganosiloxane comprises 30 weight % to 95 weight % of groups R$^A$.

12. The polydiorganosiloxane of claim 11, where each R$^M$ is a methyl group, each R$^U$ is a hexenyl group, each R$^A$ is

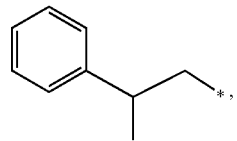 [SMILES: *CC(C)c1ccccc1]
subscript a has an average value of 5 to 7, and subscript b has an average value of 19 to 20.
* * * * *